(12) United States Patent
Nakama et al.

(10) Patent No.: US 6,766,076 B2
(45) Date of Patent: Jul. 20, 2004

(54) OPTICAL MODULE AND METHOD FOR ASSEMBLING THE SAME

(75) Inventors: Kenichi Nakama, Osaka (JP); Naoko Hikichi, Osaka (JP); Yukinari Sekiguchi, Osaka (JP); Fumitoshi Kobayashi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 172 days.

(21) Appl. No.: 10/091,158

(22) Filed: Mar. 4, 2002

(65) Prior Publication Data

US 2002/0131700 A1 Sep. 19, 2002

(30) Foreign Application Priority Data

Mar. 15, 2001 (JP) ........................................ 2001-073218
Jun. 18, 2001 (JP) ........................................ 2001-182894

(51) Int. Cl.⁷ .............................................. G02B 6/32
(52) U.S. Cl. .......................................... 385/33; 385/52
(58) Field of Search ............................. 385/31, 33–35, 385/52, 88–94, 119, 139

(56) References Cited

U.S. PATENT DOCUMENTS

| 4,812,002 | A | * | 3/1989 | Kato et al. ..................... 385/33 |
| 5,346,583 | A |   | 9/1994 | Basavanhally |
| 6,408,120 | B1 | * | 6/2002 | Dautartas ..................... 385/52 |
| 6,527,455 | B2 | * | 3/2003 | Jian ............................. 385/88 |
| 2002/0015920 | A1 |   | 2/2002 | Steinberg |
| 2002/0122619 | A1 | * | 9/2002 | Sandler et al. ................ 385/17 |

FOREIGN PATENT DOCUMENTS

| JP | 57-0148705 | 9/1982 |
| JP | 02-123301 | 5/1990 |
| JP | 09-0090162 | 4/1997 |

OTHER PUBLICATIONS

United Kingdom Search Report, Jul. 25, 2002.

* cited by examiner

Primary Examiner—Akm Enayet Ullah
Assistant Examiner—Michelle R. Connelly-Cushwa
(74) Attorney, Agent, or Firm—RatnerPrestia

(57) ABSTRACT

An optical module is provided in which any conjugate ratio in an optical axis direction may be easily realized, the time duration for alignment may be shortened by using a passive alignment technique, and a large degree of may be obtained for any optical design. The optical module comprises a planar microlens array, a transparent substrate for adjusting a conjugate ratio of the optical module, and a guide substrate for optical fibers. The planar microlens array consists of a planar transparent substrate, in one surface thereof a plurality of circular microlenses are formed and arrayed. The transparent substrate includes a plurality of micro fitting recesses formed and arrayed in one surface thereof. The guide plate includes a plurality of micro guide holes opened therethrough.

10 Claims, 6 Drawing Sheets

OPTICAL MODULE AND METHOD FOR ASSEMBLING THE SAME

BACKGROUND OF THE INVENTION

1. Field of the Invention

The present invention generally relates to an optical module, particularly to an optical module which is densely space-division multiplexed by using a microlens array, and a method for assembling the optical module.

2. Description of the Related Art

A conventional optical module of this type has been disclosed in Japanese patent publication No. 2-123301. This conventional optical module comprises, as shown in FIG. 1, a planar microlens array 60 consisting of a planar transparent substrate having microlenses 61 formed in a surface thereof. Recesses 65 are formed in a surface opposite to the lens-formed surface of the array 60, each of recesses 65 being aligned with the center position of a corresponding microlens 61. An optical element to be optically coupled to the microlens 61 is an optical fiber 63, for example. The end core portion of an optical fiber is processed by a selective etching to form a micro fitting convex portion 66. When an optical fiber is fixed to the array 60, the convex portion 65 of an optical fiber is fitted to the recess 64 through a guide hole 64 which is opened in a layer 62 of resin such as polyimide adhered to the recess-formed surface of the array 60, the guide hole serving as a guide for inserting the end of an optical fiber to a recess. According to the conventional optical module described above, an alignment can easily be conducted by inserting the convex portion 66 of an optical fiber into the fitting recess 65 to fix it thereto, instead of an active alignment (i.e., light is guided into an optical fiber and the position of the optical fiber is regulated so as to maximize light coupled to a microlens).

The conventional optical module described above causes the following problems in such a case that the optical module is used to combine especially with a planar optical element. That is, when the planar optical element is a planar transmission optical element module such as a liquid crystal switch, a microlens optical system must be constructed by a collimate optical system having an infinite conjugate ratio. On the contrary, a microlens optical system is required to be constructed by a reducing image optical system having a finite conjugate rate, when the planar optical element is an optical element module which connects a light-emitting element such as a laser array to an optical fiber. It should be noted that the conjugate ration means the ratio of an object distance to an image distance.

In the case of an optical module coupled to optical fibers, a microlens optical system is required to be constructed by a unity magnification image optical system, while in the case of an optical module coupled to a planar optical element such as a photo-detector array having a light-receiving area larger than a mode field diameter of an optical fiber, a microlens optical system is required to be constructed by a magnification image optical system.

In order to satisfy these requirements, planar microlens arrays each having a different focal length of microlens are prepared separately so that an optimal conjugate ratio may be obtained for respective application in the conventional optical module, or the thickness of a substrate of planar microlens array is regulated to obtain an optimal conjugate ratio. As a result, the number of kinds of planar microlens arrays will be increased. Also, when the optical characteristic of an optical module is regulated in an experimental environment for example, it is often required to remake a planar microlens array. In such a case, an efficient development and early implementation of optical modules will be disturbed.

SUMMARY OF THE INVENTION

Accordingly, the object of the present invention is to provide an optical module wherein any conjugate ratio thereof in an optical axis direction may be easily realized.

Another object of the present invention is to provide an optical module wherein the time duration for alignment may be shortened by using a passive alignment technique (i.e., a method of alignment based on an accuracy of a mechanical dimension).

A further object of the present is to provide an optical module wherein a large degree of freedom may be obtained for any optical design.

A further object of the present invention is to provide a method for assembling the optical module described above.

Therefore, a first aspect of the present invention is an optical module comprising: a planar microlens array having a plurality of microlenses formed in at least one surface thereof; a planar transparent substrate for adjusting a conjugate ratio of the optical module, one surface of the transparent substrate being adhered to one surface of the planar microlens array, and a plurality of micro fitting recesses being formed in the other surface of the transparent substrate with each of the recesses being aligned to each of the microlenses; and a guide substrate for optical fibers, the guide substrate being adhered to the other surface of the transparent substrate, and the guide substrate having a plurality of micro guide holes opened therein with each of the guide holes being aligned to each of the recesses.

A second aspect of the present invention is a method for assembling an optical module comprising the steps of: preparing a planar microlens array having a plurality of microlenses formed in at least one surface thereof; adhering one surface of a planar transparent substrate for adjusting a conjugate ratio of the optical module to one surface of the planar microlens array, the transparent substrate having a plurality of micro fitting recesses formed in the other surface thereof, in such a manner that the center position of each of the recesses is aligned to the center position of each of the microlenses; and adhering one surface of a guide substrate for optical fibers to the other surface of the transparent substrate, the guide substrate having a plurality of micro guide holes opened therein, in such a manner that the center position of each of the guide holes is aligned to the center position of each of the recesses.

DETAILED DESCRIPTION OF PREFERRED EMBODIMENTS OF THE INVENTION

Figure 1:
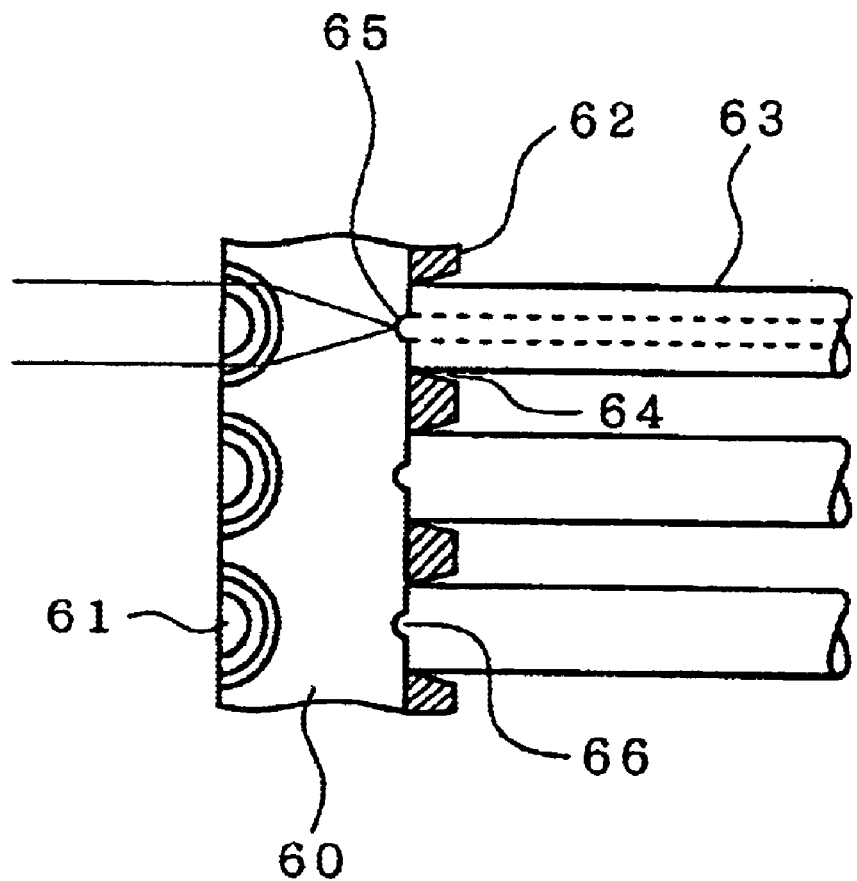
FIG. 1 is a cross-sectional view illustrating a conventional optical module.
Figure 2:
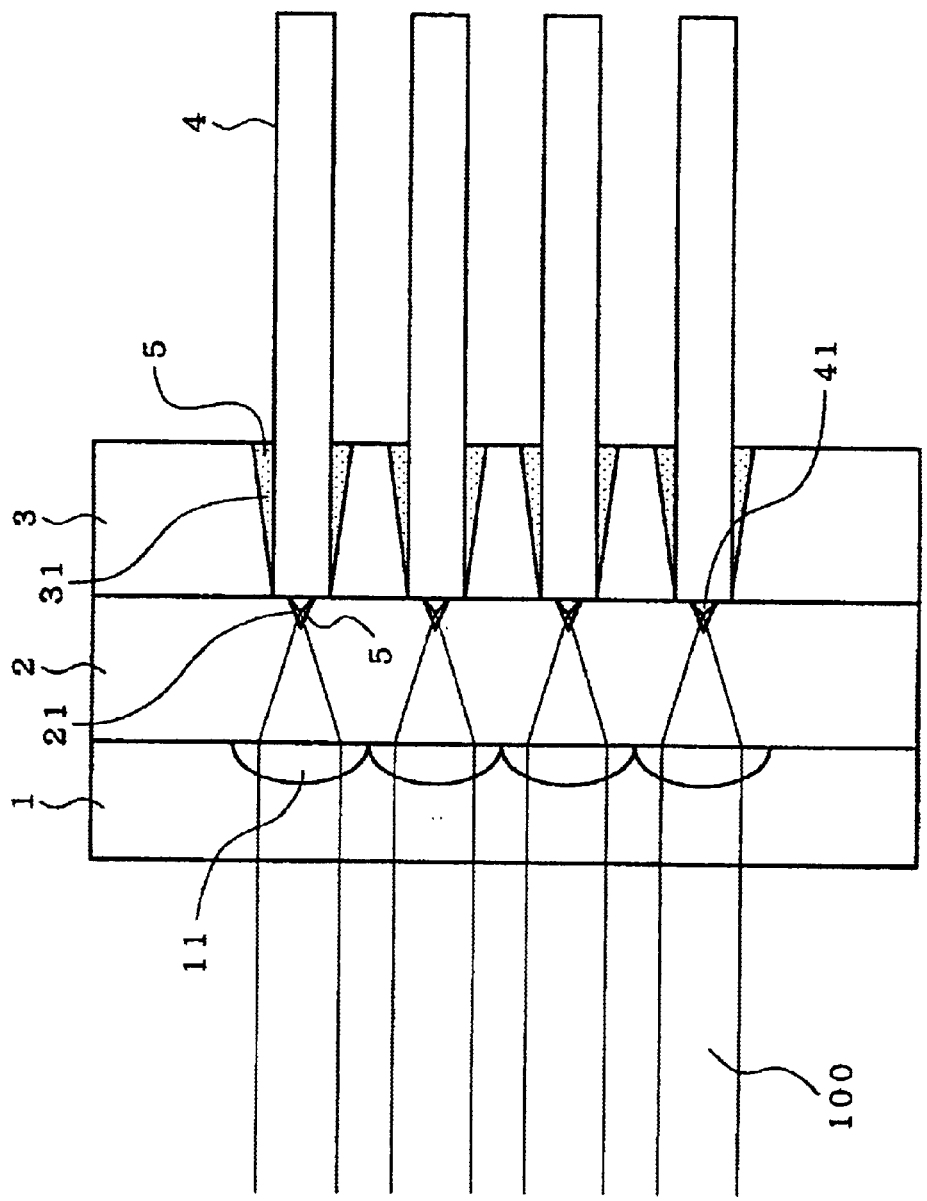
FIG. 2 is a cross-sectional view illustrating an optical module of a first embodiment according to the present invention.

Referring now to FIG. 2, there is shown a first embodiment of an optical module according to the present invention. The optical module comprises a planar microlens array 1, a transparent substrate 2 for adjusting a conjugate ratio of the optical module, a guide substrate 3 for optical fibers, and a plurality of optical fibers 4. The planar microlens array 1 consists of a planar transparent substrate, in one surface thereof a plurality of circular microlenses 11 are formed and arrayed. The transparent substrate 2 includes a plurality of micro fitting recesses 21 formed and arrayed in one surface thereof. The guide plate 3 includes a plurality of micro guide holes 31 opened therethrough. The end core portion of each optical fiber 4 is exposed convexly to form a micro fitting convex portion 41. The substrate of planar microlens array 11, the transparent substrate 2, and the guide substrate 3 are formed in such a manner that respective outer edge sizes thereof are the same.

In one example, a planar microlens array consisting of the transparent substrate having an index of refraction $n_L=1.54$ is used, a plurality of circular microlenses 11 being formed in the surface of the transparent substrate by an ion exchange method. The focal length of a micro lens 11 is 650 μm.

The transparent substrate 2 for adjusting a conjugate ratio of the optical module may be fabricated in a following manner. At first, an aluminosilicate glass plate is prepared, which has an index of refraction $n_L=1.54$ and the surface being ion exchanged by Ag. Next, a laser beam outputted from Nd:YAG laser is focused onto the surface of the aluminosilicate glass plate using a planar microlens array for processing. Focused beam spots form the fitting recesses 21 of substantially conical shape by heating. The inlet diameter and depth of a recess are about 8 μm and about 4 μm, respectively, which are matched to the fitting convex portion 41 of the optical fiber's end.

According to the fabricating method described above, the positional relation between fitting recesses 21 may be accurately determined, and then the center position of a fitting recess 21 may be accurately aligned to the center position of a microlens 11.

The guide substrate 3 for optical fibers may be fabricated in a following manner. At first, an aluminosilicate glass plate is prepared, which has a thickness of 300 μm and the surface being ion exchanged by Ag. Next, a photomask pattern having a desired patterning is formed on one surface of the glass plate by means of a reducing image optical system comprising $K_rF$ excimer laser as a light source. Using this photomask pattern, tapered micro guide holes 31 are opened each thereof having an inlet of larger diameter and an outlet the diameter thereof is smaller than that of the inlet. The outlet diameter of a micro guide hole is selected to be 75 μm, and the taper angle is selected to be 6°, for example, considering the processing capability of the excimer laser and the workability of an optical fiber.

The micro guide holes 31 of the guide substrate 3 are formed in such a manner that the positional relation between guide holes is accurate and the center position of a guide hole of the substrate 3 is precisely aligned to the center position of a fitting recess 21 of the transparent substrate 2.

The fitting convex portion 41 of an optical fiber's end is fabricated by dipping the end of an optical fiber in an etchant which has faster etching rate to a clad glass of optical fiber than that to a core glass thereof, e.g. in the mixture of hydrofluoric acid and ammonium fluoride. While the outer shape of fitting convex portion 41 may be controlled by an etching condition, an substantially conical shape is selected herein in which the diameter of base portion is 8.5 μm (with respect to the diameter 75 μm of the clad at the end of optical fiber) and the height is 3 μm, for example.

In the present embodiment described above, the thickness of the transparent substrate 2 for adjusting a conjugate ratio is $f_L \times n_h$, wherein $f_L$ is a focal length of microlens 11 and $n_h$ is an index of refraction of the substrate 2.

Next, a method for assembling the optical module in the first embodiment will now be described. As the microlenses 11, the micro fitting recesses 21, and the micro guide holes 31 are formed in a manner described above, the positional relation among these elements may be established with a high accuracy, as required. Therefore, the optical module of the present invention may be assembled by using a passive alignment technique based on a positional regulation without using an active alignment technique based on an optical regulation in which light is inputted to the optical system.

Also, as the respective outer edge sizes of the substrate of planar microlens array 1 and the transparent substrate 2 including micro fitting recesses 21 are the same, respective microlenses 11 may be substantially aligned to respective fitting recesses only by laying the transparent substrate 2 on top of the substrate of planar microlens array 1 in such a manner that respective outer edges of these two substrates are matched. The superposition of these two substrates is finally regulated by monitoring the regulation using a microscope in such a manner that the center position of the fitting recess 21 is aligned to the center position of the circular microlens 11. It is enough for this regulation to be carried out with respect to several pairs of microlens and recess, because the positional relations between the microlenses and that between the fitting recesses are established accurately, respectively, as stated above. Then, adhesive (an index of refraction thereof is matched to that of these two substrates) is applied to the opposite surfaces of these two substrate 1 and 2 to be contacted, and these two substrates are adhered to each other.

Next, the guide substrate 3 which has the same outer size as that of said two substrates 1 and 2 is laid on the recess-formed surface of the substrate 2 in such a manner that respective outer edges of these substrates 1, 2 and 3 are matched. As a result the center position of the recess 21 is substantially aligned to the center position of the guide hole 31. In addition, the final regulation is carried out by monitoring the regulation using a microscope in such a manner that the center position of the guide hole 31 is aligned to the center position of the recess 21. Then, the substrate 3 is adhered to the substrate 2 by adhesive, an index of refraction thereof being matched to that of these two substrates.

As described above, the convex portion 41 to be fitted to the recess 21 is formed on the end core portion of the optical fiber 4. Therefore, the end core portion of the optical fiber 4 may be guided and aligned to the optical axis of the microlens 11 only by inserting the optical fiber into the guide hole 31 from the inlet thereof to fit the convex portion 41 of the optical fiber to the recess 21 of the substrate 2. The aligned optical fiber 4 is adhered and fixed to the recess 21 and the guide substrate 3 by adhesive 5, an index of refraction thereof being matched to the that of the substrates 2 and 3. In this case, the space between the recess 21 and the convex portion 41 and the space between the optical 4 and the sidewall of the guide hole 31 are filled with the adhesive 5.

According to the optical module assembled described above, it may be confirmed that collimated light beams 100 are outputted from the planar microlens array 1 when monitoring the light outputted from the planar microlens array 1 by means of an infrared CCD camera.

Figure 3:
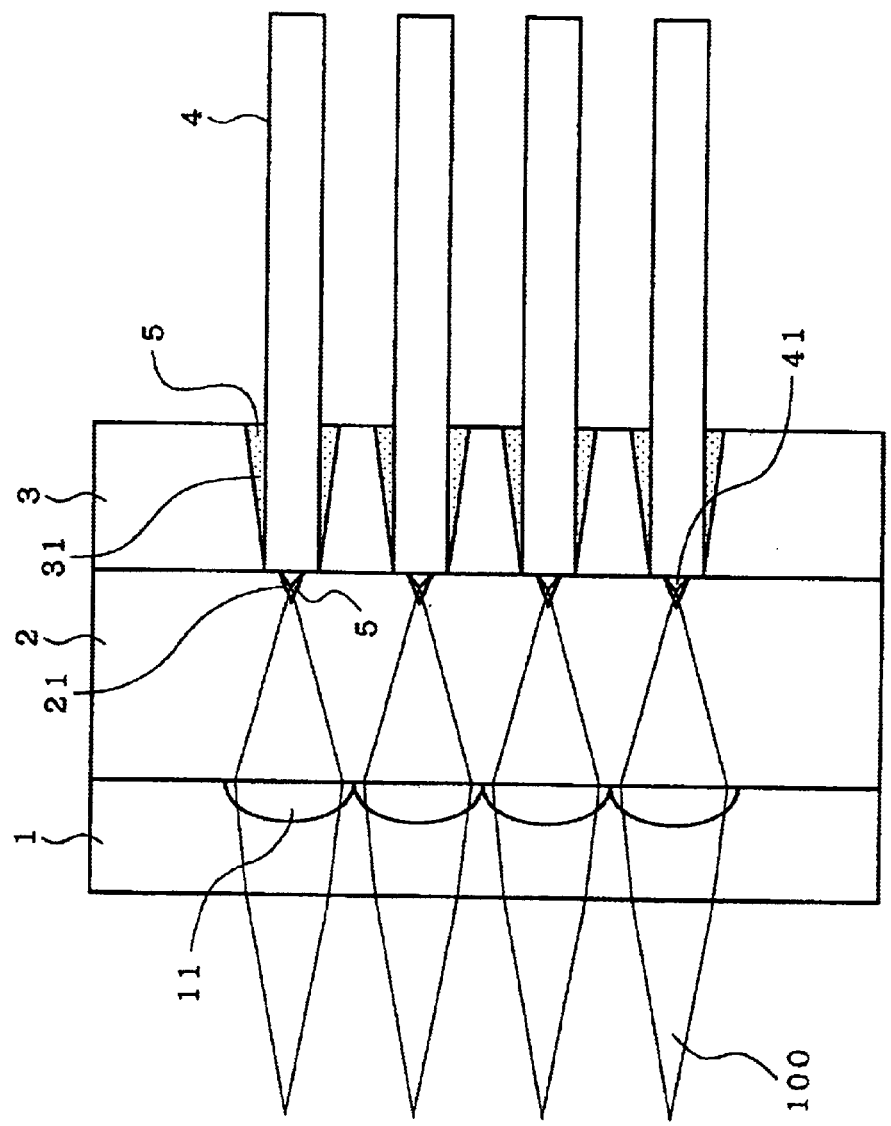
FIG. 3 is a cross-sectional view illustrating one example of a second embodiment according to the present invention.

Referring now to FIG. 3, there is shown a second embodiment of an optical module according to the present invention. In the present embodiment, a plurality of transparent substrates for adjusting a conjugate ratio of the optional module are prepared in advance, the transparent substrate having a different thickness, respectively. A desired optical module may be implemented by selecting one of the plurality of transparent substrates for a suitable usage.

In one example shown in FIG. 3, when the thickness of a transparent substrate 2 is selected to be "$t_h$", the transparent substrate 2 which satisfies the following relation, i.e. $2 \times f_L \times n_h > t_h > f_L \times n_h$ is employed, wherein $f_L$ is a focal length and $n_h$ is an index of refraction of the substrate 2. In this case, the light beam 100 outputted from the microlens array 1 is focused at the position where a magnified image is obtained, as shown in FIG. 3. That is, the end core portion of the optical fiber 4 is imaged in an increasing magnification at an image plane.

It is preferable to select the transparent substrate having the thickness described in FIG. 3, if an effective light-receiving area of the optical element to be coupled to the optical module is larger than the end core portion of optical fiber 4.

Figure 4:
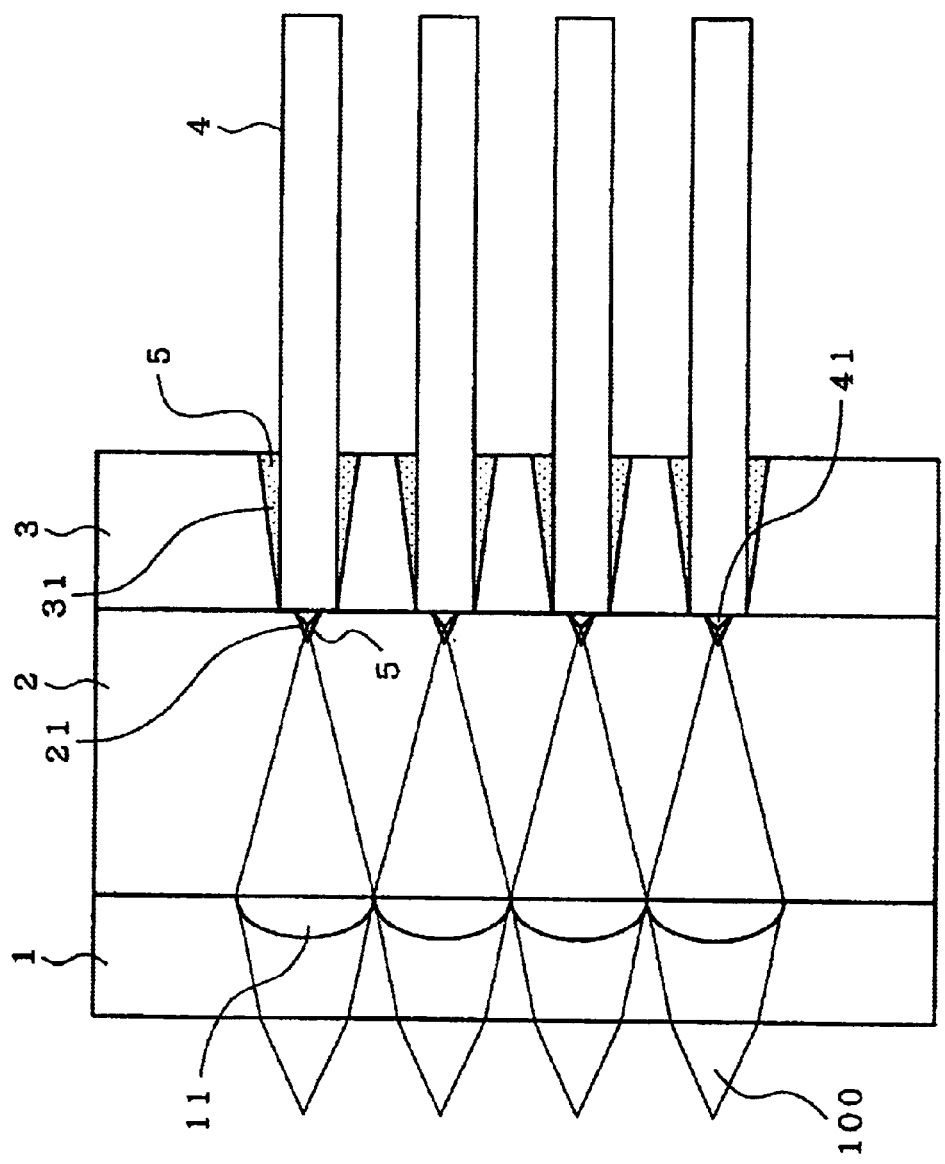
FIG. 4 is a cross-sectional view illustrating another example of a second embodiment according to the present invention.

In another example shown in FIG. 4, when the transparent substrate 2 which has a thickness $t_h = 2 \times f_L \times n_h$ is selected, the light beams outputted the microlens array 1 are focused at the position of unity magnification, as shown in FIG. 4. The core portion of the optical fiber is imaged in unity magnification. That is, the end core portion of the optical fiber 4 is imaged in the same size at an image plane.

It is preferable to select the transparent substrate having the thickness described in FIG. 4, if an optical element to be combined with the optical module is an optical fiber and a unity magnification is required so that a coupling efficiency is an optimal value.

Figure 5:
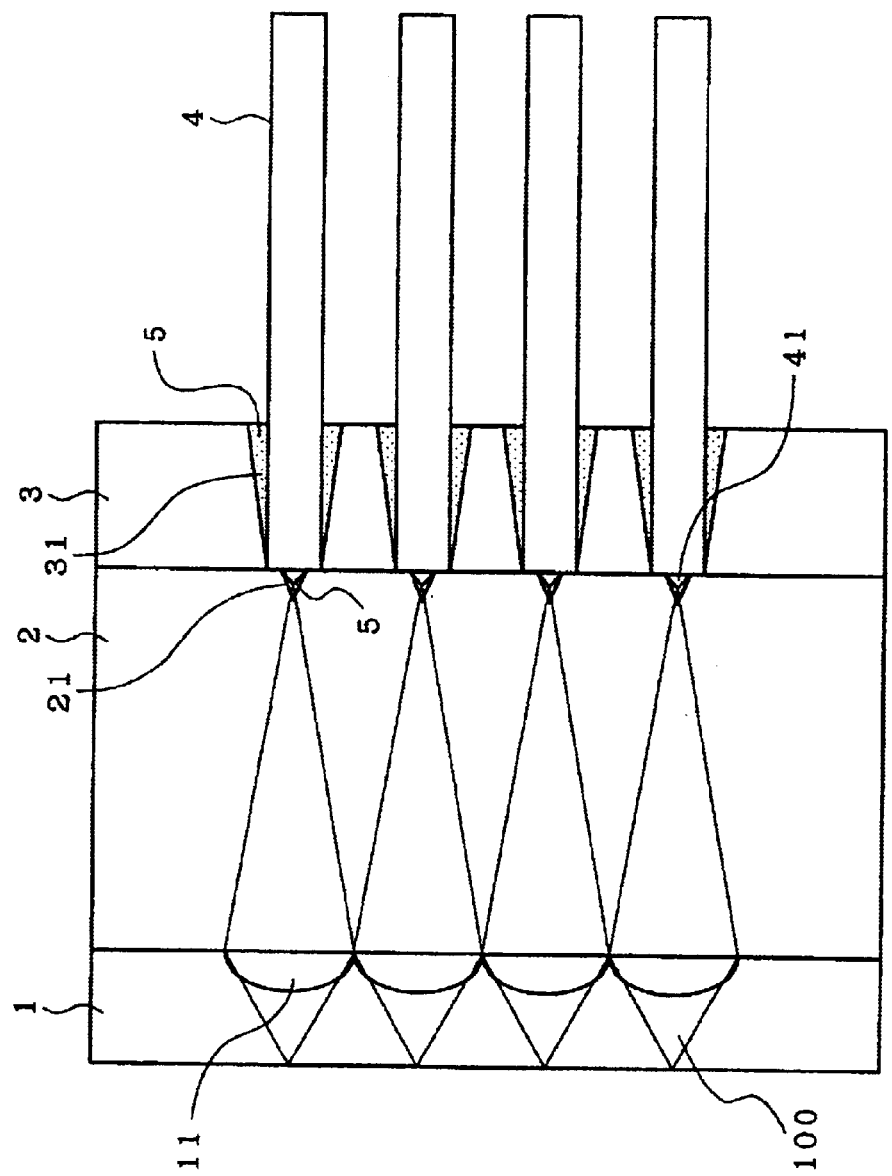
FIG. 5 is a cross-sectional view illustrating further example of a second embodiment according to the present invention.

In further example shown in FIG. 5, the transparent substrate 2 which satisfies the following relation, i.e. $t_h > 2 \times f_L \times n_h$ is selected. In this case, the light beams outputted from the microlenses array 1 are focused on the surface opposite to the lens-formed surface of the substrate of the optical microlens array 1, as shown in FIG. 5. That is, the end core portion of the optical fiber 4 is imaged in a reducing magnification.

It is preferable to select the transparent substrate having the thickness described in FIG. 5, if an optical element to be combined with the optical module is a photodetector in which an effective light-receiving area is smaller than the end core portion of optical fiber 4.

In a particular example, when an index of refraction of the substrate of an optical microlens array 1 is $n_L$, a thickness of that substrate is $t_L$, and a thickness of the transparent substrate 2 for adjusting a conjugate ratio is $t_h$, the transparent substrate 2 which satisfies the following relation, i.e. $(1/(n_L \cdot t_L) + 1/(n_h \cdot t_h)) = (1/f_L)$ is used. In this case, the end core portion of optical fiber 4 and the lens-formed surface of the planar microlens array are in conjugate relation, so that the light beams may be focused on the lens-formed surface.

Figure 6:
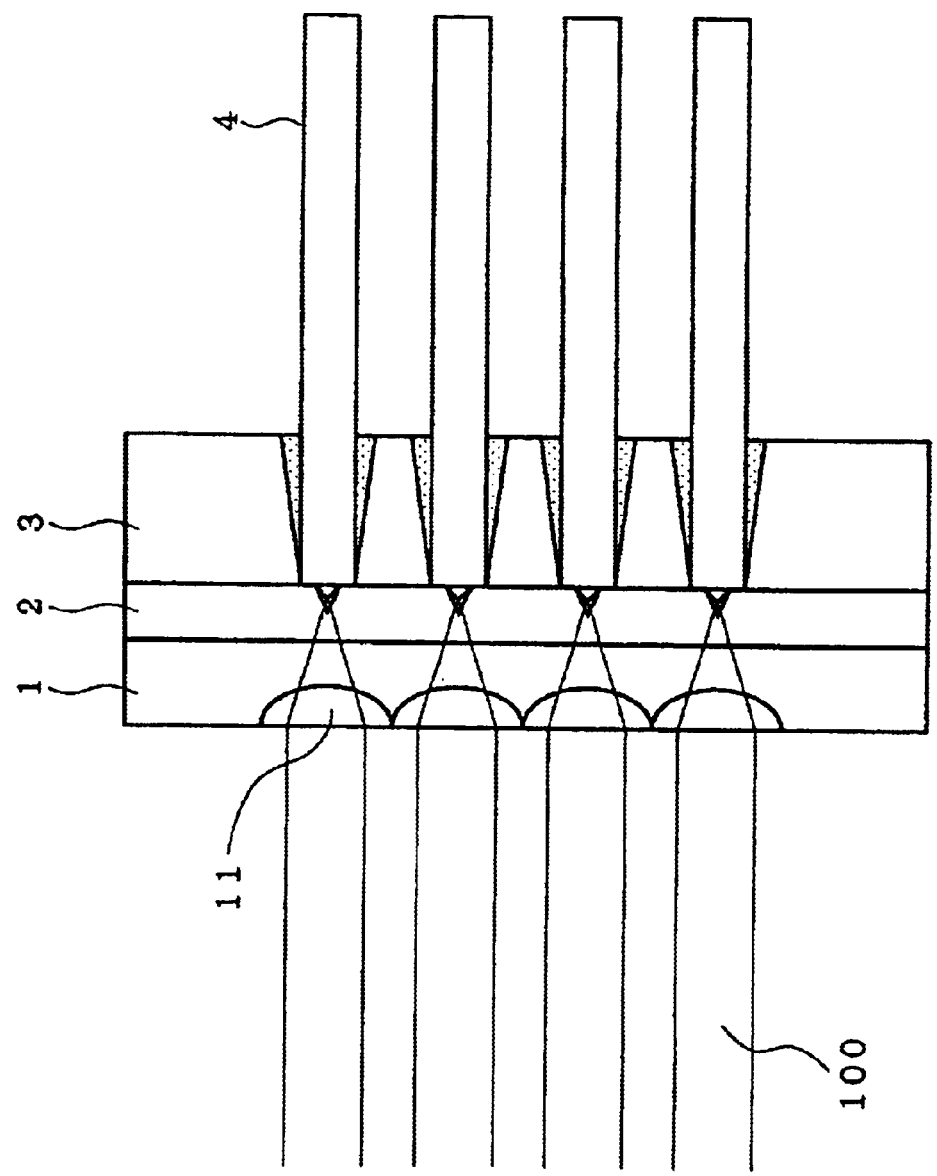
FIG. 6 is a cross-sectional view illustrating a third embodiment according to the present invention.

While the planar microlens array 1 is adhered to the substrate 2 for adjusting a conjugate ratio with the lens-formed surface of the array 1 being opposed to the substrate 2, the surface opposite to the lens-formed surface may be adhered to the substrate 2. The optical module in this case is shown in FIG. 6 as a third embodiment. The thickness of the transparent substrate 2 is required to be decided considering the thickness of the planar microlens array 1.

It will be understood by those who skilled in the art that the present invention may be applicable to a planar microlens array on both sides thereof microlenses are formed. Furthermore, the present invention is not limited to an optical module having one planar microlens array, but may be applied to an optical module having a plurality of planar microlens arrays.

According to the present invention, respective optical axes of a plurality of microlenses and respective optical fibers may be passively aligned, and respective conjugate ratio of a plurality of microlenses may be adjusted at the same time. Therefore, the design for various micro optics may be implemented quickly and at a lower price by using the same planar microlens array. Also, respective components may easily be aligned with a high accuracy by a passive alignment technique, so that the development of an optical module may progress effectively. As a result, a low cost optical module having a large degree of freedom for any optical design may be implemented.

What is claimed is:

1. An optical module comprising:
    a planar microlens array having a plurality of microlenses formed in at least one surface thereof;
    a planar transparent substrate for adjusting a conjugate ratio of the optical module, one surface of the transparent substrate being adhered to one surface of the planar microlens array, and a plurality of micro fitting recesses being formed in the other surface of the transparent substrate with each of the recesses being aligned to each of the microlenses; and
    a guide substrate for optical fibers, the guide substrate being adhered to the other surface of the transparent substrate, and the guide substrate having a plurality of micro guide holes opened therein with each of the guide holes being aligned to each of the recesses.

2. The optical module of claim 1, wherein each of the guide holes is a tapered micro guide hole having an inlet and an outlet the diameter thereof is smaller than that of inlet.

3. The optical module of claim 2, further comprising a plurality of optical fibers each having a micro fitting convex portion to be fitted into one of the recesses, the micro fitting convex portion consisting of an end core portion exposed convexly of each of optical fibers.

4. The optical module of claim 1, 2 or 3, wherein the conjugate ratio is adjusted by varying the thickness of the transparent substrate.

5. The optical module of claim 4, wherein respective outer edge sizes of the planar microlens array, the planar transparent substrate, and the guide substrate are the same.

6. A method for assembling an optical module comprising the steps of:
    preparing a planar microlens array having a plurality of microlenses formed in at least one surface thereof;
    adhering one surface of a planar transparent substrate for adjusting a conjugate ratio of the optical module to one surface of the planar microlens array, the transparent substrate having a plurality of micro fitting recesses formed in the other surface thereof, in such a manner that the center position of each of the recesses is aligned to the center position of each of the microlenses; and
    adhering one surface of a guide substrate for optical fibers to the other surface of the transparent substrate, the guide substrate having a plurality of micro guide holes opened therein, in such a manner that the center position of each of the guide holes is aligned to the center position of each of the recesses.

7. The method of claim 6, wherein each of the guide holes is a tapered micro guide hole having an inlet and an outlet the diameter thereof is smaller than that of inlet.

8. The method of claim 7, wherein the step of adhering the transparent substrate to the planar microlens array includes the steps of:

laying the transparent substrate on top of the planar microlens array in such a manner that respective outer edges of the transparent substrate and the planar microlens array are matched;

regulating the positional relation between the transparent substrate and the planar microlens array in such a manner that the center position of each of the recesses is aligned to the center position of each of the microlenses and adhering the transparent substrate to the planar microlens array.

9. The method of claim 8, wherein the steps of adhering the guide substrate to the transparent substrate includes the steps of:

laying the guide substrate on top of the transparent substrate in such a manner that respective outer edges of these substrates are matched;

regulating the positional relation between the guide substrate and the transparent substrate in such a manner that the center position of each of the guide holes is aligned to the center position of each of the recesses; and adhering the guide substrate to the transparent substrate.

10. The method of any one of claims 6–9, further comprising the steps of:

preparing a plurality of optical fibers each having a micro fitting convex portion consisting of an end core portion exposed convexly, inserting the plurality of optical fibers into the guide holes, respectively; and adhering the plurality of optical fibers to the recesses and guide holes.

* * * * *